Figure 1:
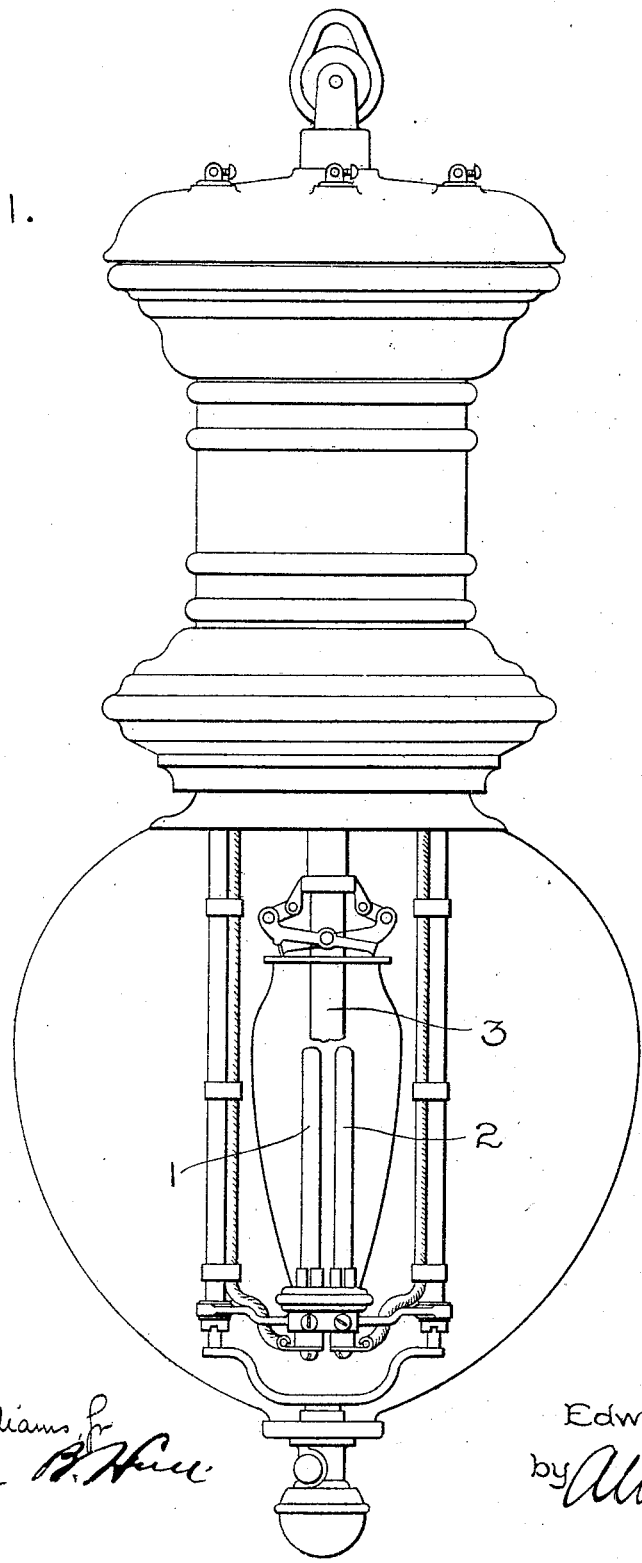

No. 641,891. Patented Jan. 23, 1900.
E. W. RICE, Jr.
ELECTRIC ARC LAMP.
(Application filed Aug. 7, 1899.)
(No Model.) 2 Sheets—Sheet 1.

Witnesses.
Edward Williams Jr
Benjamin B Hull

Inventor.
Edwin W. Rice, Jr.
by Albert G Davis
Atty.

THE NORRIS PETERS CO., PHOTO-LITHO., WASHINGTON, D. C.

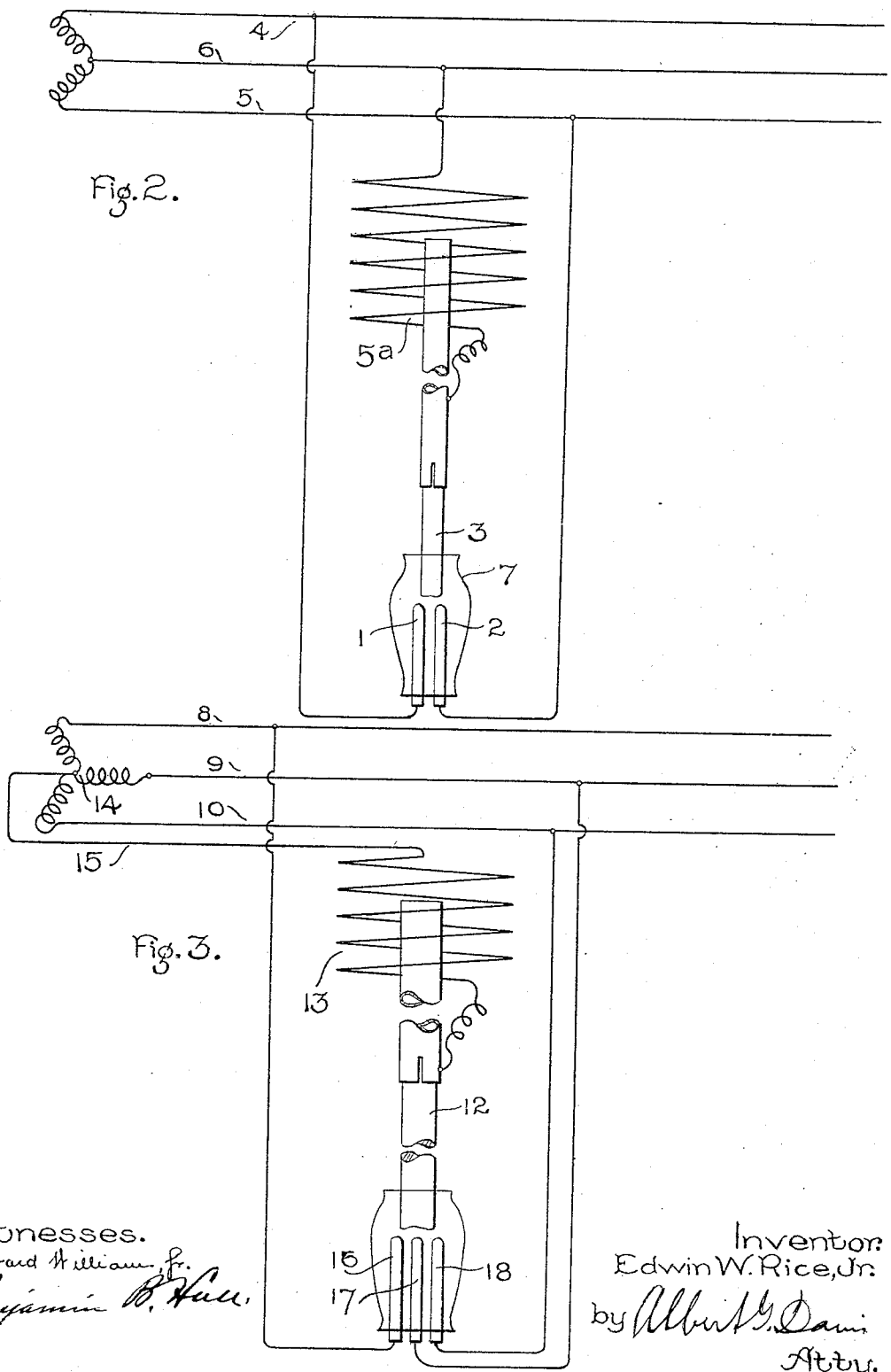

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

ELECTRIC-ARC LAMP.

SPECIFICATION forming part of Letters Patent No. 641,891, dated January 23, 1900.

Application filed August 7, 1899. Serial No. 726,370. (No model.)

*To all whom it may concern:*

Be it known that I, EDWIN W. RICE, Jr., a citizen of the United States, residing at Schenectady, county of Schenectady, State of New York, have invented certain new and useful Improvements in Arc-Lamps, (Case No. 1,173,) of which the following is a specification.

The object of the present invention is to provide an alternating-current arc-lamp which will burn with a comparatively-steady arc under currents of low frequency and through the instrumentality of a single arc-regulating electrode. In carrying out the invention I provide the lamp with a plurality of electrodes carrying polyphase currents, one of said electrodes being under the influence of the arc-regulating mechanism of the lamp to maintain a uniform arc length. When operating with a two-phase current, I provide a lamp with three electrodes, two of which connect with two of the leads from a two-phase circuit and the other from a common return for the two phases, the latter being controlled by the arc-regulating circuit. When operating with a three-phase current, I employ four electrodes, three of which connect with respective leads of the triphase circuit and the other with a compensating wire symmetrically related with respect to the three phases and on which at the point of connection with the triphase system there is zero potential. In the lead between the movable electrode and this compensating wire may be interposed regulating-circuits which adjust the position of the movable electrode. With an organization of this kind some one of the phases is always active in maintaining the arc, as there are no intervals of zero potential at the arc-terminals, and a steady light is produced at a much lower frequency than is possible with a single-phase current. This will be readily understood on consideration of the fact that the energy of a polyphase system is substantially constant from instant to instant.

The several features of novelty of the invention will be hereinafter more particularly described and will be definitely pointed out in the claims.

In the drawings which illustrate my invention, Figure 1 is a view of a two-phase lamp embodying my improvements, an inclosed-arc type of lamp being shown. Figs. 2 and 3 are diagrammatic views of the controlling-circuits of a two and a three phase lamp, respectively.

While I have herein illustrated a two-phase and three-phase type of lamp, I wish it to be understood that my invention is equally applicable to a polyphase current of any number of phases and have specifically shown the two types merely as examples for systems commonly employed in the commercial distribution of electricity.

Referring first to Fig. 2, 1 2 3 represent three carbon electrodes, the former of which connect, respectively, with two leads 4.5 of a quarter-phase distribution-circuit. A third carbon connects through a regulating-coil of the lamp $5^a$ with a common return-wire 6. If the system be of the type, however, in which two independent quarter-phase circuits are employed, the third carbon may have a common connection with two of the leads or may be fed by a transformer, the secondary of which is provided with three leads, as indicated in the figure. The regulating mechanism is shown only in a diagrammatic way in the drawings, as of course many different feed-regulating devices and circuit arrangements may be employed. The coil $5^a$ being in series with the arc and electrically connected with the movable electrode varies in its magnetic effect under the varying lengths of the arc and may operate a clutch in the usual manner for effecting periodic feed of the movable electrode. The movable electrode should be given a greater cross-section than the electrodes 1 and 2, since it carries the sum of the currents transmitted through the lower carbons. I have shown the arc as surrounded by a transparent or translucent inclosure 7 to prolong the life of the electrodes. This, however, is not essential to the practice of my invention, as the latter may be applied to open air as well as inclosed arcs. It will be evident that since the two currents differ in phase the arc will be much steadier with low frequency than where a a single-phase current is employed, since there will always be a considerable potential difference between the arc-terminals.

With a triphase current still better results may be obtained. In this case I prefer to connect the movable electrode and regulating-coil with a point of zero potential between the three supply-wires of the triphase circuit. An organization of this kind is depicted in Fig. 3, where 8, 9, and 10 represent the three leads of a triphase circuit, and 11 a source of triphase current, which may be a supply-generator located at the main station or a local source, such as a transformer. The movable electrode 12 and series regulating-coil 13 are connected with a point 14 common to the three phases by a compensating wire 15. At the point 14, as is well understood, there is zero potential so long as the circuit is uniformly balanced; but between the movable electrode 12 and the three fixed electrodes 16 17 18, connecting, respectively, with the leads 8, 9, and 10, there is a potential varying in value from zero to the maximum potential of the system. The regulating-coil 13 will therefore be energized and will strike the arc in a manner similar to the ordinary operation of any arc-lamp, and an arc will be maintained between the movable electrode and each of the three stationary electrodes. As the sum of the three currents is a constant value, the luminosity of the arc will be fairly constant at very low frequencies. The stationary electrodes should be spaced a wider distance apart relatively to one another than the arc length for which the lamp is adjusted, as it is undesirable to permit an arc across them which might be maintained after the fashion of a Jablochkoff candle by the path between the different potential mains if the distance were sufficiently short to maintain an arc and would conduce to an irregular action of the lamp.

What I claim as new, and desire to secure by Letters Patent of the United States, is—

1. An arc-lamp provided with a plurality of stationary electrodes adapted for connection with currents differing in phase, a single movable electrode in circuit, and a regulator controlling said electrode to adjust and maintain the arc.

2. A multiphase arc-lamp with a plurality of electrodes in circuit with two or more currents differing in phase, a movable electrode in a common return for said currents, and a regulating device for maintaining and adjusting the arc.

3. A triphase arc-lamp, comprising three electrodes adapted for connection with the three leads of a triphase circuit, a fourth electrode connecting with a point common to the three phases, and means for feeding the electrodes relatively to one another, to maintain the arc constant.

4. A triphase arc-lamp provided with three electrodes connecting respectively with the three leads of a triphase circuit, a fourth electrode connected to a point of zero potential with respect to said circuit, and a regulating-coil between said electrode and point of zero potential.

5. A triphase arc-lamp provided with three electrodes connecting respectively with the three leads of a triphase circuit, a fourth electrode connected to a point symmetrically related electrically to said leads, and means for regulating the arc.

6. An arc-lamp provided with a plurality of electrodes all symmetrically related electrically with respect to the leads of a polyphase alternating-current circuit and means for effecting relative movement between one of the electrodes and the others to maintain the arc.

In witness whereof I have hereunto set my hand this 5th day of August, 1899.

EDWIN W. RICE, JR.

Witnesses:
BENJAMIN B. HULL,
EDWARD WILLIAMS, Jr.